(12) United States Patent
Rose

(10) Patent No.: US 11,038,309 B1
(45) Date of Patent: Jun. 15, 2021

(54) MODULAR ELECTRICAL RECEPTACLE ASSEMBLY

(71) Applicant: Group Dekko, Inc., Garrett, IN (US)

(72) Inventor: Scott E. Rose, Auburn, IN (US)

(73) Assignee: Group Dekko, Inc., Garrett, IN (US)

( * ) Notice: Subject to any disclaimer, the term of this patent is extended or adjusted under 35 U.S.C. 154(b) by 0 days.

(21) Appl. No.: 16/715,592

(22) Filed: Dec. 16, 2019

(51) Int. Cl.
*H01R 13/74* (2006.01)
*H01R 13/514* (2006.01)

(52) U.S. Cl.
CPC ......... *H01R 13/748* (2013.01); *H01R 13/514* (2013.01)

(58) Field of Classification Search
CPC ........................... H01R 13/748; H01R 13/514
USPC ...................................................... 439/540.1
See application file for complete search history.

(56) References Cited

U.S. PATENT DOCUMENTS

| | | | |
|---|---|---|---|
| 3,953,933 A | 5/1976 | Goldstein | |
| 4,367,370 A * | 1/1983 | Wilson .................. | H02G 3/288 174/495 |
| 4,835,343 A | 5/1989 | Graef et al. | |
| 5,011,427 A * | 4/1991 | Martin ............... | H01R 13/6395 439/373 |
| 5,073,681 A | 12/1991 | Hubben et al. | |
| 5,477,010 A * | 12/1995 | Buckshaw ............... | H02G 3/14 174/67 |
| 5,723,817 A * | 3/1998 | Arenas ..................... | H02G 3/14 174/66 |
| 5,998,735 A * | 12/1999 | Patterson, Jr. ........... | H02G 3/14 174/67 |
| 6,750,398 B1 | 6/2004 | Richardson | |
| 6,956,169 B1 * | 10/2005 | Shotey .................... | H02G 3/121 174/50 |
| 7,119,278 B1 * | 10/2006 | Shotey ..................... | H02G 3/14 174/66 |
| 7,166,801 B1 * | 1/2007 | Gretz ..................... | H02G 3/121 174/481 |
| 7,183,487 B1 * | 2/2007 | O'Young ................. | H02G 3/14 174/66 |
| 7,255,588 B2 * | 8/2007 | Wilder ............... | H01R 13/6392 439/373 |
| 7,902,458 B2 * | 3/2011 | Eshelman ................ | H02G 3/14 174/66 |
| 7,947,903 B2 | 5/2011 | Peck | |
| 8,222,521 B2 | 7/2012 | Kimbrell et al. | |
| 8,245,453 B2 * | 8/2012 | Struthers ................ | H02G 3/123 52/27 |
| 8,344,251 B2 * | 1/2013 | Eshelman ................ | H02G 3/14 174/66 |
| 8,592,681 B2 * | 11/2013 | Alderson ............... | H01H 13/86 174/66 |

(Continued)

*Primary Examiner* — Peter G Leigh
(74) *Attorney, Agent, or Firm* — Taylor IP, P.C.

(57) ABSTRACT

An electrical receptacle assembly for use in a modular wall system, the electrical receptacle assembly including an electrical receptacle receiving assembly, at least one electrical receptacle electrically coupled to the electrical receptacle receiving assembly and first and second plates. The first plate is coupled to the electrical receptacle receiving assembly. The first plate has an opening through which the at least one electrical receptacle is accessible. The second plate is installed substantially parallel to the first plate. The second plate having an opening that only accommodates access to the at least one electrical receptacle.

19 Claims, 2 Drawing Sheets

(56) References Cited

U.S. PATENT DOCUMENTS

| | | | |
|---|---|---|---|
| 9,301,410 B2* | 3/2016 | Rohmer | H01H 13/20 |
| 9,484,751 B2* | 11/2016 | Byrne | H02J 50/40 |
| 9,653,898 B1* | 5/2017 | Deaton | H02G 3/083 |
| 9,728,947 B2* | 8/2017 | Trojanowski | H02G 3/081 |
| 9,887,528 B2* | 2/2018 | Melistas | H02G 3/14 |
| 10,454,258 B2* | 10/2019 | Daniels | H02G 3/14 |
| 2012/0090867 A1 | 4/2012 | Marrero | |
| 2014/0182876 A1* | 7/2014 | Trojanowski | H02G 3/14 |
| | | | 174/66 |

* cited by examiner

MODULAR ELECTRICAL RECEPTACLE ASSEMBLY

BACKGROUND OF THE INVENTION

1. Field of the Invention

The present invention relates to electrical power receptacle assemblies, and, more particularly, to modular electrical receptacle covers.

2. Description of the Related Art

In many applications, electrical receptacles are needed to receive and distribute power. They are required in permanent locations such as walls in fixed structures, as well as temporary locations such as modular office furniture. Many types of receptacles are required according to the needs of users. Some receptacles, for example, include distribution of power for computers, telephones, and corded appliance, etc. The electrical receptacles also are required in places that are convenient for the user, and they may need to be re-locatable.

A receptacle cover plate, as known in the industry does not actually cover the portion of the electrical receptacle that provides a user access to the electrical connection, but rather covers the internal coupling of wires to the receptacle. The cover generally convers a box that is mounted to a structural member in a wall and the cover is generally secured to the box or the receptacle itself using fasteners such as screws.

What is needed in the art is an electrical system that allows for electrical power delivery without the use of fasteners being seen by a user.

SUMMARY OF THE INVENTION

The present invention is directed to an improved electrical receptacle cover arrangement.

The present invention provides a modular wall system having an electrical receptacle assembly mounted therein. The electrical receptacle assembly including an electrical receptacle receiving assembly, at least one electrical receptacle electrically coupled to the electrical receptacle receiving assembly and first and second plates. The first plate is coupled to the electrical receptacle receiving assembly. The first plate has an opening through which the at least one electrical receptacle is accessible. The second plate is installed substantially parallel to the first plate. The second plate having an opening that only accommodates access to the at least one electrical receptacle.

The present invention further provides an electrical receptacle assembly for use in a modular wall system, the electrical receptacle assembly including an electrical receptacle receiving assembly, at least one electrical receptacle electrically coupled to the electrical receptacle receiving assembly and first and second plates. The first plate is coupled to the electrical receptacle receiving assembly. The first plate has an opening through which the at least one electrical receptacle is accessible. The second plate is installed substantially parallel to the first plate. The second plate having an opening that only accommodates access to the at least one electrical receptacle.

The present invention further provides an electrical receptacle assembly including a housing, an electrical receptacle receiving assembly positioned within the housing and at least one electrical receptacle electrically coupled to the electrical receptacle receiving assembly. The electrical receptacle includes first and second plates. The first plate is coupled to the electrical receptacle receiving assembly, and the first plate has an opening through which the at least one electrical receptacle is accessible. The second plate is installed substantially parallel to the first plate. The second plate is coupled to the first plate and/or the housing without using any fasteners extending through the second plate, the second plate having openings that accommodate access to the at least one electrical receptacle.

An advantage of the present invention is that the outlet assembly presents a clean look without fasteners being exposed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
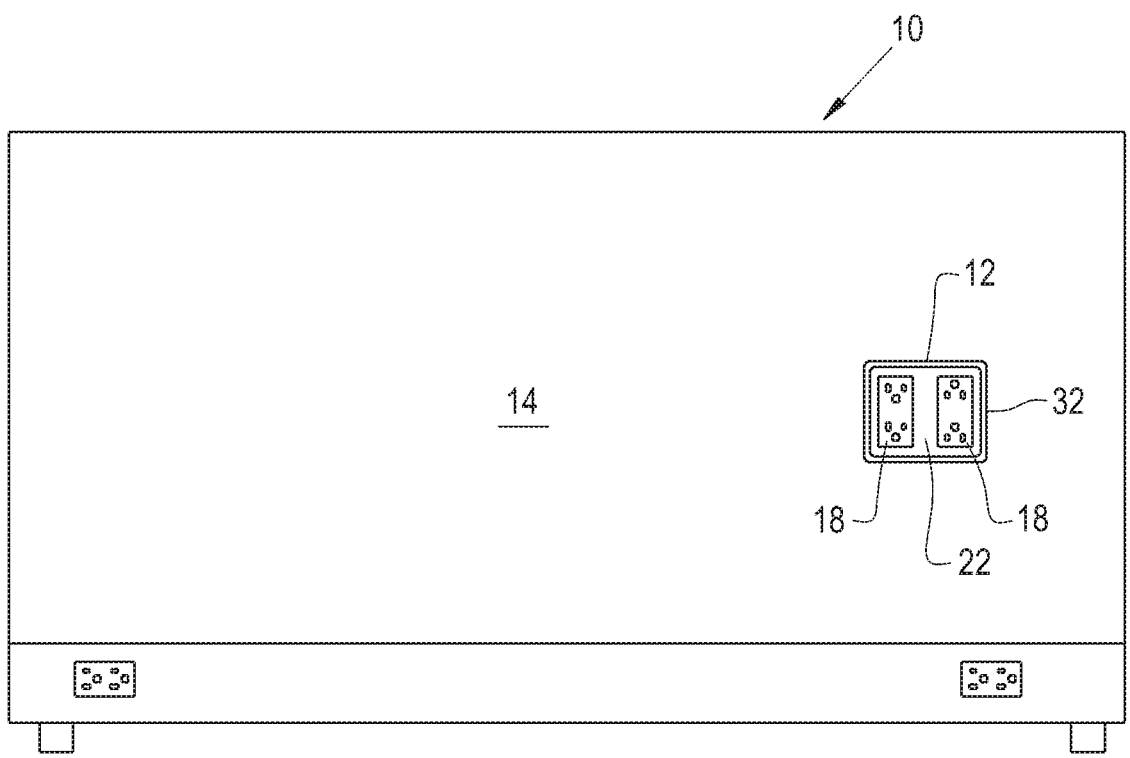
FIG. 1 is a perspective view of an embodiment of a modular wall system having an electrical receptacle assembly of the present invention therein.

Referring now to FIG. 1, there is shown an embodiment of a modular wall system 10 with an electrical receptacle assembly 12 installed therein. Electrical receptacle assembly 12 has a clean look with no exposed fasteners being seen.

Figure 2:
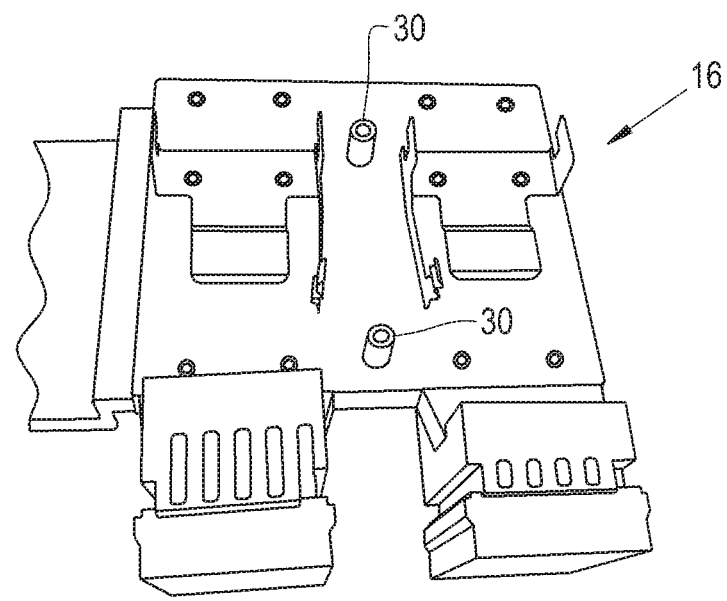
FIG. 2 is a front perspective view of an electrical receptacle receiving assembly which is part of the electrical receptacle assembly of FIG. 1.
Figure 3:
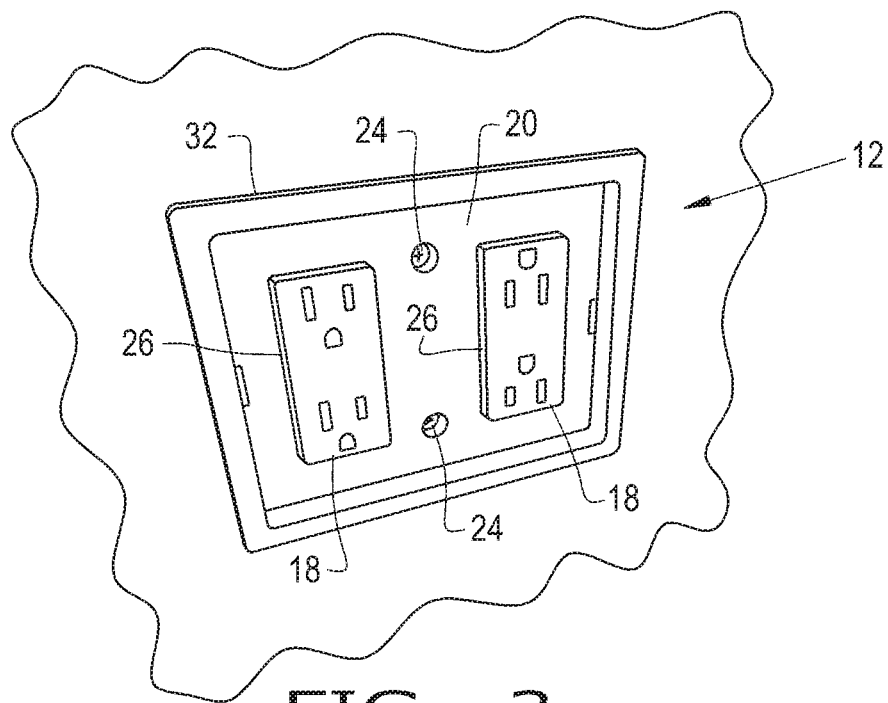
FIG. 3 is a front perspective view of the electrical receptacle assembly of FIG. 1 without an outer cover plate.
Figure 4:
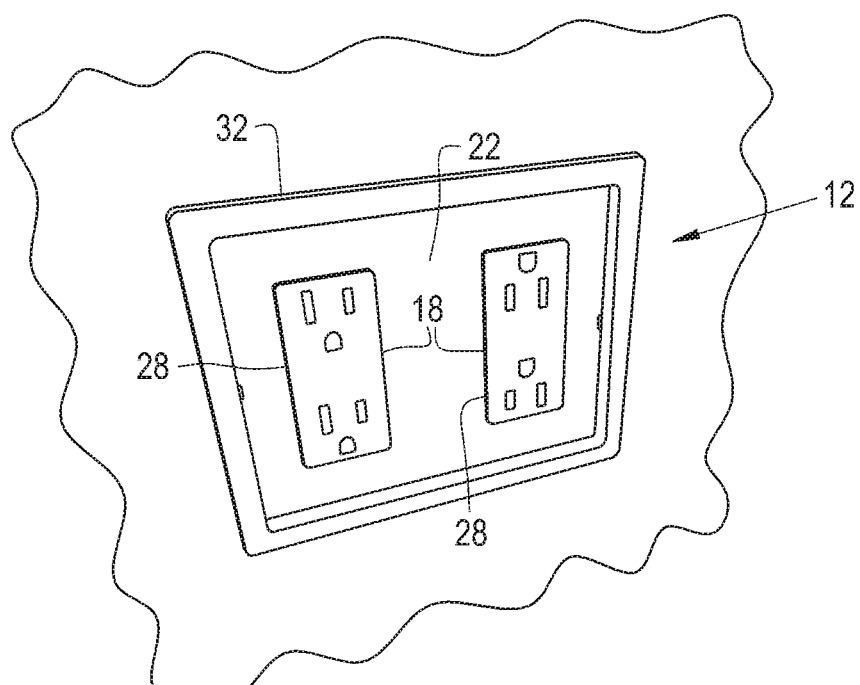
FIG. 4 is a front perspective view of the electrical receptacle assembly of FIGS. 1 and 3 with the outer cover plate installed.

Now, additionally referring to FIGS. 2-4, modular wall system 10 includes a movable wall panel 14 in which electrical receptacle assembly 12 is positioned. Electrical receptacle assembly 12 includes an electrical receptacle receiving assembly 16, at least one electrical receptacle 18 electrically coupled to electrical receptacle receiving assembly 16, a first plate 20 and a second plate 22.

First plate 20 is coupled to electrical receptacle receiving assembly 16 by way of fasteners 24. First plate 20 has an opening 26 through which the at least one electrical receptacle 18 is accessible. The second plate 22 is installed substantially parallel to first plate 20, and second plate 22 has an opening 28 that only accommodates access to the at least one electrical receptacle 18.

First plate 20 is coupled to electrical receptacle receiving assembly 16 by way of fasteners 24 that extend through first plate 20 and engage screw receiving bosses 30 on electrical receptacle receiving assembly 16. First plate 20 may serve to position and retain electrical receptacles 18 to electrical receptacle receiving assembly 16. Second plate 22 covers fasteners 24 that extend through first plate 20. Electrical receptacle receiving assembly 16 is shown in FIG. 2 ready to accept two receptacles 18. Electrical receptacle receiving assembly 16 is configured to supply electricity to electrical receptacles 18 and assembly 16 provides for electrical distribution to other electrical assemblies. Electrical receptacle receiving assembly 16 is installed within wall 14. While electrical receptacle receiving assembly 16 is shown as an assembly for one embodiment of the present invention, other assemblies the perform the same function are also contemplated.

Electrical receptacle assembly 12 further includes a bezel 32 or a housing 32 that extends around an interior open edge (not shown) in wall panel 14. Second plate 22 is coupled to bezel 32, housing 32 and/or first plate 20. However, second plate 22 has no fasteners extending therethrough, and the only openings in second plate 22 are provided so that outlet receptacles 18 are accessible to a user. Opening 26 in first plate 20 that accommodates the electrical receptacles 18 has the same shape as opening 28 in second plate 22.

Second plate 22 may be coupled to first plate 20, bezel 32 or housing 32 by way of clips, interference tolerances of the parts, or hidden retainers. Second plate 22 is removable so that access to first plate 20 can be obtained for disassembly of electrical receptacle assembly 12.

While electrical receptacles have been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A modular wall system, comprising:
    a movable wall panel; and
    an electrical receptacle assembly positioned in the wall panel the electrical receptacle assembly including:
        an electrical receptacle receiving assembly;
        at least one electrical receptacle electrically coupled to the electrical receptacle receiving assembly;
        a first plate coupled to the electrical receptacle receiving assembly, the first plate having a first opening through which the at least one electrical receptacle is accessible; and
        a second plate installed substantially parallel to the first plate, the second plate having a second opening that receives the at least one receptacle such that the second opening only accommodates access to the at least one electrical receptacle.

2. The modular wall system of claim 1, wherein the first plate is coupled to the electrical receptacle receiving assembly by way of fasteners that extend through the first plate.

3. The modular wall system of claim 2, wherein the second plate covers the fasteners that extend through the first plate.

4. The modular wall system of claim 1, wherein the electrical receptacle assembly further includes a bezel.

5. The modular wall system of claim 4, wherein the second plate is coupled to the bezel and/or the first plate.

6. The modular wall system of claim 5, wherein the second plate has no fasteners extending therethrough.

7. The modular wall system of claim 1, wherein the first opening in the first plate that accommodates the electrical receptacle has the same shape as the second opening in the second plate.

8. An electrical receptacle assembly for use in a modular wall system, the electrical receptacle assembly comprising:
    an electrical receptacle receiving assembly;
    at least one electrical receptacle electrically coupled to the electrical receptacle receiving assembly;
    a first plate coupled to the electrical receptacle receiving assembly, the first plate having a first opening through which the at least one electrical receptacle is accessible; and
    a second plate installed substantially parallel to the first plate, the second plate having a second opening that receives the at least one receptacle such that the second opening only accommodates access to the at least one electrical receptacle.

9. The electrical receptacle assembly of claim 8, wherein the first plate is coupled to the electrical receptacle receiving assembly by way of fasteners that extend through the first plate.

10. The electrical receptacle assembly of claim 9, wherein the second plate covers the fasteners that extend through the first plate.

11. The electrical receptacle assembly of claim 8, wherein the electrical receptacle assembly further includes a bezel.

12. The electrical receptacle assembly of claim 11, wherein the second plate is coupled to the bezel and/or the first plate.

13. The electrical receptacle assembly of claim 12, wherein the second plate has no fasteners extending therethrough.

14. The electrical receptacle assembly of claim 8, wherein the first opening in the first plate that accommodates the electrical receptacle has the same shape as the second opening in the second plate.

15. An electrical receptacle assembly, comprising:
    a housing;
    an electrical receptacle receiving assembly positioned within the housing;
    at least one electrical receptacle electrically coupled to the electrical receptacle receiving assembly;
    a first plate coupled to the electrical receptacle receiving assembly, the first plate having a first opening through which the at least one electrical receptacle is accessible; and
    a second plate installed substantially parallel to the first plate, the second plate being coupled to the first plate and/or the housing without using any fasteners extending through the second plate, the second plate having a second opening that receives the at least one receptacle such that the second opening accommodate access to the at least one electrical receptacle.

16. The electrical receptacle assembly of claim 15, wherein the first plate is coupled to the electrical receptacle receiving assembly by way of fasteners that extend through the first plate.

17. The electrical receptacle assembly of claim 16, wherein the second plate covers the fasteners that extend through the first plate.

18. The electrical receptacle assembly of claim 15, wherein the second plate has no fasteners extending therethrough.

19. The electrical receptacle assembly of claim 15, wherein the first opening in the first plate that accommodates the electrical receptacle has the same shape as the second opening in the second plate.

* * * * *